(12) United States Patent
Letzsch

(10) Patent No.: US 7,273,543 B2
(45) Date of Patent: Sep. 25, 2007

(54) PROCESS AND APPARATUS FOR CONTROLLING CATALYST TEMPERATURE IN A CATALYST STRIPPER

(75) Inventor: Warren Letzsch, Ellicott City, MD (US)

(73) Assignee: Stone & Webster Process Technology, Inc., Houston, TX (US)

( * ) Notice: Subject to any disclaimer, the term of this patent is extended or adjusted under 35 U.S.C. 154(b) by 382 days.

(21) Appl. No.: 10/633,879

(22) Filed: Aug. 4, 2003

(65) Prior Publication Data
US 2005/0029163 A1 Feb. 10, 2005

(51) Int. Cl.
C10G 11/00 (2006.01)
C10G 35/10 (2006.01)

(52) U.S. Cl. .................. 208/113; 208/154; 208/159; 208/160

(58) Field of Classification Search ................ 208/113, 208/154, 159, 160
See application file for complete search history.

(56) References Cited

U.S. PATENT DOCUMENTS

| | | | |
|---|---|---|---|
| 2,436,927 A | 3/1948 | Kassel | |
| 2,735,802 A | 2/1956 | Jahnig | |
| 2,970,117 A | 1/1961 | Harper | |
| 3,672,069 A | 6/1972 | Reh et al. | |
| 3,702,886 A | 11/1972 | Argauer et al. | |
| 3,758,403 A | 9/1973 | Rosinski et al. | |
| 3,990,992 A | 11/1976 | McKinney | |
| 4,009,121 A | 2/1977 | Luckenbach | |
| 4,064,039 A | 12/1977 | Penick | |
| 4,219,442 A | 8/1980 | Vickers | |
| 4,220,622 A | 9/1980 | Kelly | |
| 4,272,402 A * | 6/1981 | Mayes | 502/40 |
| 4,284,494 A | 8/1981 | Bartholic et al. | |
| 4,325,817 A | 4/1982 | Bartholic et al. | |
| 4,328,384 A | 5/1982 | Daviduk et al. | |
| 4,343,634 A | 8/1982 | Davis | |
| 4,353,812 A | 10/1982 | Lomas et al. | |
| 4,388,218 A | 6/1983 | Rowe | |
| 4,404,095 A | 9/1983 | Haddad et al. | |
| 4,406,776 A * | 9/1983 | Strother | 208/153 |
| 4,419,221 A | 12/1983 | Castagnos, Jr. et al. | |
| 4,433,984 A | 2/1984 | Gartside et al. | |
| 4,434,245 A | 2/1984 | Lomas et al. | |
| 4,439,533 A | 3/1984 | Lomas et al. | |
| 4,483,276 A | 11/1984 | Lomas et al. | |

(Continued)

FOREIGN PATENT DOCUMENTS

EP 1 247 567 A1 10/2002

OTHER PUBLICATIONS

Bai, Yaoshua, "Heat Transfer in the Circulating Fluidized Bed of a Commericial Catalyst Cooler;" Refinery, Daqing Petrochemical Complex, CNPC, Longfeng District, Daqing, Heilongjiang 163711, People's Republic of China; Available Online Jul. 7, 2000.

(Continued)

Primary Examiner—Glenn Caldarola
Assistant Examiner—John Douglas
(74) Attorney, Agent, or Firm—Hedman & Costigan, P.C.

(57) ABSTRACT

A process and an apparatus for catalytic cracking a hydrocarbon feed to lighter hydrocarbon employing a catalyst cooler in flow communication with a catalyst stripper is disclosed.

23 Claims, 5 Drawing Sheets

U.S. PATENT DOCUMENTS

| | | |
|---|---|---|
| 4,615,992 A | 10/1986 | Murphy |
| 4,737,346 A | 4/1988 | Haddad et al. |
| 4,749,471 A | 6/1988 | Kam et al. |
| 4,756,886 A | 7/1988 | Pfeiffer et al. |
| 4,828,679 A | 5/1989 | Cormier, Jr. et al. |
| 4,891,129 A | 1/1990 | Barnes |
| 4,965,232 A | 10/1990 | Mauleon et al. |
| 4,980,053 A | 12/1990 | Li et al. |
| 5,027,893 A | 7/1991 | Cetinkaya et al. |
| 5,043,058 A | 8/1991 | Forgac et al. |
| 5,087,427 A | 2/1992 | Quinn et al. |
| 5,089,235 A | 2/1992 | Schwartz et al. |
| 5,232,675 A | 8/1993 | Shu et al. |
| 5,234,578 A | 8/1993 | Stine et al. |
| 5,248,408 A | 9/1993 | Owen |
| 5,259,855 A | 11/1993 | Ross, Jr. et al. |
| 5,296,131 A * | 3/1994 | Raterman .................. 208/113 |
| 5,326,465 A | 7/1994 | Yongqing et al. |
| 5,346,610 A | 9/1994 | Owen et al. |
| 5,351,749 A | 10/1994 | Lai et al. |
| 5,358,918 A | 10/1994 | Yukang et al. |
| 5,380,690 A | 1/1995 | Zhicheng et al. |
| 5,571,482 A | 11/1996 | Long et al. |
| 5,601,787 A | 2/1997 | Owen et al. |
| 5,670,037 A | 9/1997 | Zaiting et al. |
| 5,976,355 A | 11/1999 | Johnson et al. |
| 6,210,562 B1 | 4/2001 | Xie et al. |
| 6,211,104 B1 | 4/2001 | Shi et al. |
| 6,482,312 B1 | 11/2002 | Gartside et al. |

OTHER PUBLICATIONS

Chan, Ting Y and Soni, Dalip S., et al., "Advances in Catalyst Cooler Technology;" Process Heating/Fluid Flow Sep. 1999.

Lai, Zhouping, "Catalyst Cooling Techniques in Heavy Oil FCCU;" Lianyou Sheji Bianjibu (1995), 25(6), 44-8.

"MSCC Process;" UOP LLC, 25 East Algonquin Road, Des Plaines, IL 60017-5017, www.uop.com, no year.

* cited by examiner

PROCESS AND APPARATUS FOR CONTROLLING CATALYST TEMPERATURE IN A CATALYST STRIPPER

BACKGROUND OF THE INVENTION

1. Field of the Invention

The present invention relates generally to a process and apparatus for prolonging the useful life of catalyst for continuous use in a high temperature fluidized catalytic cracking environment and more specifically to an apparatus and process for controlling and reducing the temperature of catalyst residing in the stripping zone to improve catalytic cracking efficiencies, extend time between catalyst replacement, and lower the environmental impact of the hydrocarbon cracking process.

2. Description of Related Art

Fluidized catalytic cracking ("FCC") processes are widely used for the conversion of hydrocarbon feed streams, such as vacuum gas oils and other relatively heavy oils, into lighter and more valuable hydrocarbon products.

The basic components of the fluidized catalytic cracking unit ("FCCU") include a reactor, a disengager, a catalyst stripper and a catalyst regenerator. The reactor includes a contact zone, most often in a riser column, where the hydrocarbon feed is contacted with hot particulate catalyst to crack the hydrocarbon feed into lighter hydrocarbon products. A separation zone, or disengager, where product vapors from the cracking reaction are separated from the catalyst, most often is located at, or is contiguous with, the downstream end of the riser column.

The FCC process is carried out by contacting the hydrocarbon feed with a catalyst made up of a finely divided or particulate solid material. The catalyst is transported like a fluid by passing gas or vapor through it at sufficient velocity to produce a desired regime of fluid transport.

In riser cracking, regenerated catalyst and starting hydrocarbon feed enter a generally cylindrical reactor and are transported upward by the expansion of the gases that result from vaporization of the hydrocarbons and fluidizing media upon contact with the hot catalyst and, optionally, by provision of a lift gas. At the end of the reaction zone, the reactor effluent comprises spent catalyst, hydrocarbon product and optional lift gas. In order to recover the catalyst and the hydrocarbon products, the effluent is separated in a separation zone into a hydrocarbon rich vapor phase and a solids rich phase comprising spent catalyst.

The separated, still hot, spent catalyst is delivered from the separation zone to the stripper zone. During the cracking phase, the particulate catalyst absorbs hydrocarbon vapors. Spent catalyst, therefore, contains an appreciable quantity of removable or strippable hydrocarbon. The catalyst stripper receives spent catalyst from the separation zone and removes entrained hydrocarbons from the spent catalyst by counter-current contact with steam or other stripping medium.

In the stripping zone, a stripping gas, most often steam, is introduced via an inlet in a lower portion of the stripping vessel. The stripping gas rises through the stripping vessel and flows counter current to the hot spent catalyst flowing downward, across mixing baffles or packing, toward an outlet located at the lower portion of the stripper zone. As the stripping gas flows through the hot spent catalyst, it strips the hydrocarbon vapors absorbed on the catalyst surface. The stripped hydrocarbon vapors then may be recovered.

The hot spent stripped catalyst then is transferred from the stripper to a catalyst regenerator for purposes of removing the coke. During the cracking reaction, coke is deposited on the catalyst, which partially deactivates the catalyst. Coke is a byproduct of the cracking reaction and is comprised of hydrogen and carbon and possibly other materials in trace quantities, such as sulfur and metals, which enter the process with the starting material.

Coke is removed from the catalyst in the regenerator by oxidation with an oxygen-containing gas. Oxidizing the coke from the catalyst surface releases a large amount of heat, a portion of which leaves the regenerator with gaseous products of coke oxidation, generally referred to as flue gas. The balance of the heat leaves the regenerator with the regenerated catalyst as it is returned to the reaction zone for another cycle through the FCCU.

In the above-described fashion, the fluidized catalyst is circulated continuously from the reaction zone to stripper to the regeneration zone and then back again to the reaction zone for the beginning of another cycle. The hydrocarbon products produced by the FCC reaction are recovered in vapor form and transferred to downstream product recovery facilities. Specific details of the aforementioned various contact zones, regeneration zones, and stripping zones along with all the known arrangements for conveying the catalyst between the various zones are well known to those skilled in the art.

Current industry advances in fluidized catalytic cracking allow the use of heavier hydrocarbon feeds (ie., with higher Conradson Carbon values). The heavier hydrocarbon feeds generally cause an increase in the amount of coke deposited on the catalyst during the catalytic reaction. As previously described, the heat required for the endothermic cracking reaction conditions in the reactor is provided by the burning of the coke from the spent catalyst. Accordingly, the use of heavier feeds can lead to excess heat generated during catalyst regeneration due to the burning of larger amounts of coke developed on the catalyst. The additional heat produced by the heavier feeds can create a number of problems, including upsetting the heat balance, damaging the equipment, damaging the catalyst and limiting the amount of hot catalyst that can be fed to the reaction, all of which ultimately result in lower product yields.

Some of the recent advances for cracking heavier feedstocks include employing higher temperatures in the cracking process in order to produce selectively light olefins. Regenerator temperatures today approach 1700° F. and cracking conditions may approach 1500° F. in some processes. This expedient, however, can cause deactivation of the catalyst, resulting in a shortened useful life of the catalyst, decreased efficiency of the cracking process as well as increased maintenance expenditures, FCCU down time and environmental impact. Under these recent high-temperature cracking conditions, catalyst may be maintained at relatively high temperatures in the presence of steam throughout the entire cracking process, including in the stripping zone, which may cause catalyst deactivation.

It would therefore represent a notable advance in the state of the art if an apparatus and process could be developed that reduced the temperature of the catalyst at appropriate phases of the cracking process to preserve valuable resources, maintain optimum efficiency of the furnace equipment and operations, reduce down time and lessen any impact on the environment.

Most, if not all, of the prior art methods of removing heat during the cracking process have focused on the hottest stage of the process, the regeneration stage. A very common method for heat reduction in the regeneration stage uses heat exchange means through indirect contact with a cooling medium, i.e., a catalyst cooler attached to the regenerator. Generally, indirect contact heat exchange means use cooling coils or tubes, through which a cooling fluid is passed. The cooling coils can run through a bed of the catalyst particles internal to the regenerator or through a separate catalyst bed external to the regenerator.

Heat exchangers utilizing cooling coils or tubes running through a fluidized catalyst particle bed internal to the regenerator are illustratively shown in U.S. Pat. No. 4,009,121 to Luckenbach, U.S. Pat. No. 4,220,622 to Kelley, U.S. Pat. No. 4,388,218 to Rowe and U.S. Pat. No. 4,343,634 to Davis. These internal exchangers are effective, but offer less precise temperature controlling ability, tend to have shortened life expectancy and are difficult to retrofit and/or service when they are exposed to and located in the extreme environment of the regenerator.

External heat exchangers are generally external flow-through type coolers where catalyst is withdrawn from the regenerator and directed into a separate vessel having cooling tubes or coils therein. Generally, flow-through coolers are either gravity feed, where catalyst enters one upper inlet and exits a lower outlet, or they employ fluidized transport that moves catalyst from a lower inlet past the cooling coils to an upper outlet. Back-mix heat exchangers are shown in U.S. Pat. No. 3,672,069 to Reh et al and U.S. Pat. No. 4,439,533 and U.S. Pat. No. 4,483,276 both to Lomas et al, and U.S. Pat. No. 5,027,893 to Cetinkaya et al. relating to a heat exchanger with a combination of back-mix and flow-through characteristics. Other variations, illustratively shown in U.S. Pat. No. 2,735,802 to Jahnig and U.S. Pat. No. 4,615,992 to Murphy, disclose a hot catalyst inlet at the mid-portion of the heat exchanger and an outlet at the bottom of the heat exchanger where a fluidizing gas moves the cooled catalyst back up to the regenerator vessel. Other flow-through heat exchangers are placed between the hot catalyst source (regenerator) and the reaction zone to regulate the temperature of the catalyst entering the reaction. Examples of such a system are found in U.S. Pat. Nos. 4,284,494 and 4,325,817 to Bartholic et al. A regenerator apparatus using pure gravity feed flow-through heat exchanger is shown in U.S. Pat. No. 2,970,117 to Harper. The Harper heat exchanger removes catalyst from the catalyst bed of a single stage regeneration vessel and returns the cooled catalyst at a lower portion of the catalyst bed. A regenerator apparatus using fluidized transport to move catalyst from the bottom of a single stage regenerator upward over the cooling coils and back to the top of the regenerator is described in U.S. Pat. No. 4,064,039 to Penick. A two-stage regeneration system with catalyst cooling is described in U.S. Pat. No. 4,965,232 to Mauleon et al. where regenerated catalyst is removed from the second stage and sent to a holding vessel where it is then sent to an external heat exchanger and cooled catalyst is returned to the first stage of the regeneration zone.

Regulation of the amount of cooling in the heat exchangers is achieved in various ways. For instance, U.S. Pat. Nos. 4,434,245, 4,353,812 and 4,439,533 disclose hydrocarbon conversion processes wherein the catalyst is removed from a regenerator and cooled in side or external heat exchange coolers and then returned to the regenerator. The method described for controlling heat removal in the regenerator involves the extent of immersion of the cooling coils in the dense phase regenerated catalyst bed or controlling the rate of flow of regenerated catalyst through the external coolers. U.S. Pat. No. 2,436,927 discloses a fluidized catalytic conversion process wherein the crude feed is contacted with a silica-alumina type catalyst for producing high quality gasoline. Heat removal is achieved through the use of an external cooler and control is achieved by regulating the amount of catalyst passing through that cooler. U.S. Pat. Nos. 3,990,992 and 4,219,442 illustrate regenerator units having heat removal means different from those described above. Heat removal is achieved through internal coils in the upper section of the regenerator. Temperature control is achieved by controlling the amount of regenerated catalyst removed to the upper zone and then reintroduced along with coke-contaminated catalyst to the combustion zone. The balance of the regenerated catalyst is reintroduced to the catalytic reactor.

U.S. Pat. No. 5,351,749 to Lai et al., and U.S. Pat. No. 5,571,482 to Long et al., disclose catalyst cooler apparatuses comprising substantially vertical, cylindrical and close-ended heat removal vessels with one or more modulized heat exchange tube bundles. Fluidized solid particles flow downwardly in a dense phase fluidized bed, through the interior of the cooling vessel, contacting the one or more separate modular heat exchange tube units located therein. A coolant is passed through the heat exchange tube units, each of which comprises a coolant inlet tube, a discharge tube and a coolant collecting chamber where the vapor is generated, creating a closed type coolant-to-vapor circulation. Both systems disclose a gas distributor in flow communication with a fluidizing gas conduit at the lower portion of the heat exchange vessel to discharge fluidizing gas to maintain the fluidized state of the catalyst bed in the heat exchanger, enhance circulation and promote heat exchange. The amount of cooling achieved can be regulated by variation in the amount and rate of catalyst circulating through the cooling vessel and/or the amount and rate of fluidizing gas flowing through the cooler and/or the amount, rate and/or type of cooling liquid flowing through the cooler.

The above processes and systems, however, do not teach the apparatus and process discovered by the present inventor of reducing heat exposure during the catalyst stripping stage, nor do they suggest the advantages realized by the present invention. Moreover, in relation to the catalyst stripping phase, the prior art is replete with teachings of apparatus and processes for diverting additional heat to the stripping process to increase the temperature of the catalyst during the stripping phase, i.e., the opposite of cooling the catalyst during the stripping phase.

The practice of diverting heat to the catalyst stripping phase is thought to assist in removing hydrocarbons from the spent catalyst by vaporizing the higher boiling hydrocarbons from the surface of the catalyst. The commonly employed zeolite catalysts act as an adsorbent, absorbing hydrocarbons onto the surface of the catalyst. At temperatures below 950° F., stripping efficiency generally becomes diminished and these hydrocarbons are not removed and recovered, but rather are burned off in the regeneration phase.

The present inventor has discovered, however, that in high temperature cracking operations, heating the catalyst in the stripper is not the issue. Instead, in these high temperature cracking operations, the temperature in the stripper may reach levels above those necessary for relatively efficient stripping. The present inventor has recognized that, in fact, in these high temperature cracking operations, the stripper temperature combined with the presence of steam may lead to problems with catalyst deactivation. Thus, the present inventor has now discovered unexpectedly that by employing the present invention to maintain the spent catalyst temperature in the stripping zone to below about 1100° F., preferably below about 1050° F., provides increased catalyst life and improved efficiencies in catalyst performance.

The present invention is especially important for the high temperature cracking processes practiced currently to either crack heavier and heavier feeds or produce olefins. With regenerator temperatures today approaching 1700° F. and cracking conditions approaching upwards of 1500° F., it is more common for the catalyst to stay at relatively high deactivating temperatures in the presence of steam such that catalyst in the stripper zone may be damaged.

The inventors have discovered that by using the present process and an apparatus to reduce heat exposure to the catalyst during the stripping stage, reduction in catalyst deactivation and increased overall cracking efficiency are achieved.

SUMMARY OF THE INVENTION

It is therefore an object of the present invention to extend catalyst life by providing an improved catalyst stripping process and stripper system, including providing a catalyst cooler for use in conjunction with a stripper for use during hydrocarbon cracking. It is a further object to provide such an improved system that is simple to construct in a new plant or to retrofit onto an existing cracking unit stripper.

These and other objects are achieved in a fluidized catalytic cracking system, including a process for fluidized catalytic cracking, comprising monitoring the temperature of hot spent catalyst in a catalyst stripping zone and, when the hot spent catalyst temperature in the stripping zone exceeds 1050° F., lowering the temperature of the hot spent catalyst through indirect heat exchange carried out within the stripper or by passing the hot spent catalyst through a heat exchanger means and then returning the cooled catalyst back to the stripping zone. Although the catalyst cooler of the present invention may be located internal to the stripper, it is preferred in the practice of the present invention to locate the catalyst cooler external to the stripper to provide improved temperature control, safety and servicing.

DETAILED DESCRIPTION OF THE INVENTION

The apparatus and process of the present invention comprises a cracking reactor, a disengager, a catalyst regeneration system and a novel catalyst stripper system comprising a temperature monitoring means and a catalyst cooling means comprising a heat exchanger in flow communication with the catalyst stripper. The present process and apparatus reduces the temperature of the catalyst in the stripper zone through indirect cooling utilizing indirect heat exchange between the catalyst and a cooling liquid within the catalyst cooler.

In preferred embodiments of the present invention, the present invention has application to any of the relatively high temperature catalytic cracking operations for producing olefins in the presence of steam known to those skilled in the art. In these systems, due to the presence of steam and high temperatures, catalyst deactivation becomes a more acute problem. For example, the present invention has application to fluid catalytic cracking (FCC) systems operating at riser outlet temperatures above 1050° F., deep catalytic cracking (DCC) systems and catalytic pyrolysis process (CPP) systems, among others. The FCC systems are well known to those skilled in the art and are described in the patent literature. Although, in general, FCC units do not operate at riser outlet temperatures above 1050° F., it is known in the art to operate FCC units at higher temperatures in certain desired situations. For example, the QC fluid catalytic cracking system and other FCC-quench systems may employ the expedients of the present invention. See, e.g., Johnson et al., U.S. Pat. No. 5,976,355; Gartside et al., U.S. Pat. No. 6,482,312; Quinn et al., U.S. Pat. No. 5,087,427; Forgac et al., U.S. Pat. No. 5,043,058; and Schwartz et al., U.S. Pat. No. 5,09,235.

The DCC systems are also well known in the art and are described in the patent literature, including but not limited to, Li et al., U.S. Pat. No. 4,980,053; Shu et al., U.S. Pat. No. 5,232,675; Zhicheng et al., U.S. Pat. No. 5,380,690; Zhicheng et al., U.S. Pat. No. 5,670,037, Yongqing, et al., U.S. Pat. No. 5,326,465; Yukang, et al., U.S. Pat. No. 5,358,918; Letzsch et al., U.S. patent application Ser. No. 10/043,954, filed Jan. 10, 2002. The DCC processes can operate at temperatures up to about 1200° F.

The CPP process also is known in the art and is described in Xie et al., U.S. Pat. No. 6,210,562 and Shi et al., U.S. Pat. No. 6,211,104. The CPP process can operate at temperatures up to about 1400° F. The present invention has applications to these and any other high temperature particulate catalytic cracking process.

DESCRIPTION OF THE PREFERRED EMBODIMENTS

The following detailed description of the preferred embodiments of the present invention are for illustrative purposes only and should not be construed to limit the claims in any manner whatsoever.

Figure 1:
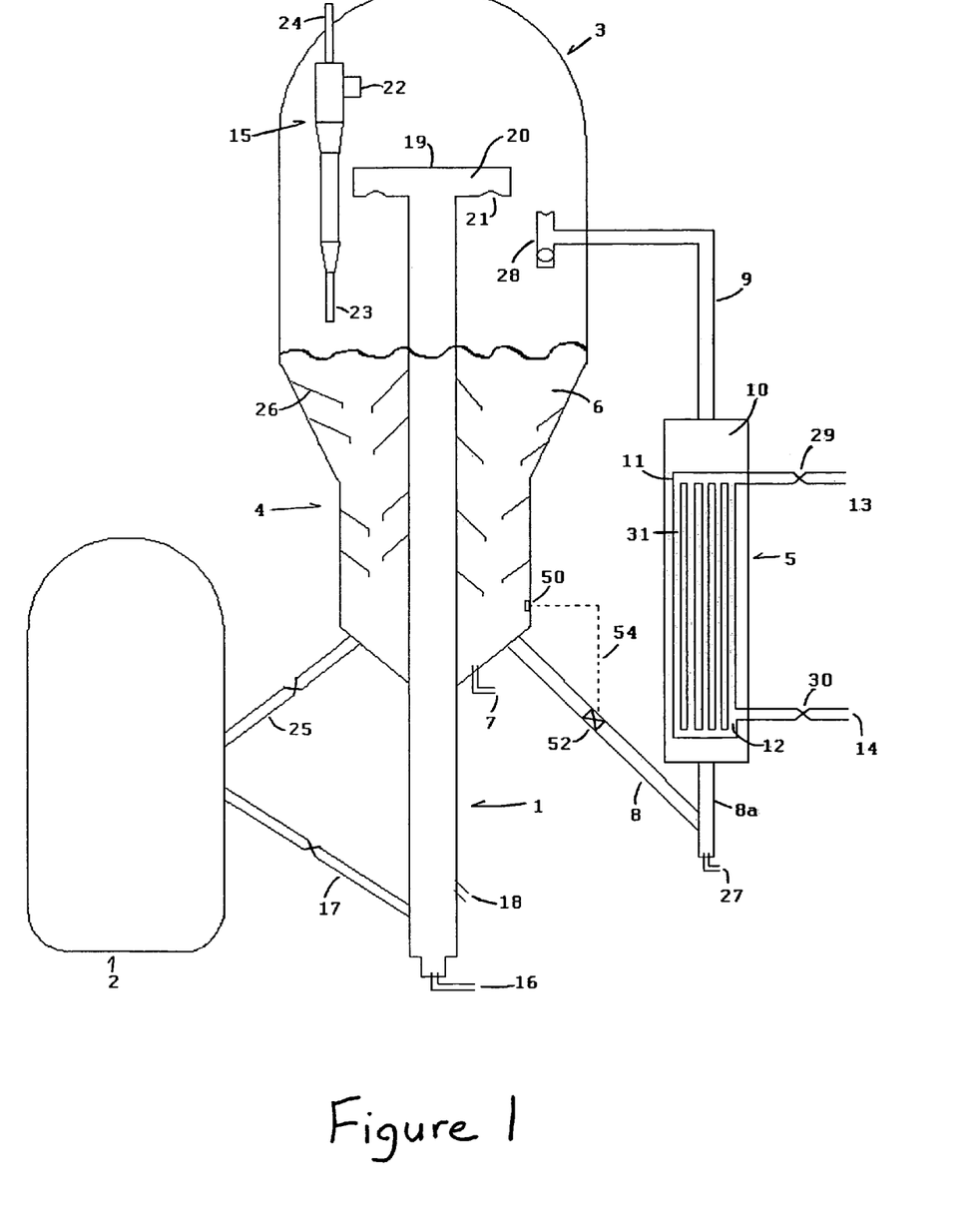
FIG. 1 is a schematic plan view of a reactor/catalyst stripper system for the fluidized catalytic cracking of hydrocarbons incorporating the catalyst cooling apparatus of the present invention.

Referring to FIG. 1, there is shown a generic catalytic cracking unit comprising a riser reactor column 1, a regenerator 2 and a disengaging vessel 3. FIG. 1 shows a preferred embodiment of a stripper system of the present invention, including catalyst stripper 4, and external catalyst cooling vessel 5. The catalyst stripper 4 includes a dense phase catalyst bed 6, stripping gas inlet 7, stripper-cooler conduit 8 and cooled catalyst return conduit 9 in flow communication with indirect heat exchange zone 10 in cooling vessel 5. Cooling vessel 5 comprises heat exchange zone 10, indirect heat exchange surfaces 11, cooling liquid zone 12, cooling liquid inlet conduit 13 and cooling liquid outlet conduit 14 in flow communication with cooling liquid zone 12. The dense phase catalyst bed 6 is located in the catalyst stripper 4, which in turn is located below a dilute vapor phase in an upper portion of disengaging vessel 3. The separator of the embodiment of FIG. 1 is located in the dilute phase portion of disengaging vessel 3 and includes end of riser 19 and transfer conduit 20. Disengaging vessel 3 also houses one or more secondary cyclones 15.

A stream of lift or fluidization gas may be first introduced through inlet conduit 16 into riser reactor 1 at its base depending on the location of the feed inlet nozzles 18. Hot catalyst from the regeneration zone is fed via conduit 17 to the lower portion of the riser reactor 1, at a point upstream from its base. The catalyst can be any catalyst capable of cracking hydrocarbon into lower molecular weight products. Typical catalysts have been described in the literature as comprised of both amorphous and crystalline materials and combinations thereof. See, e.g., Argauer et al., U.S. Pat. No. 3,702,886; Rosinski et al., U.S. Pat. No. 3,758,403; Cormier, Jr. et al., U.S. Pat. No. 4,828,679; Yukang et al., U.S. Pat. No. 5,358,918; Shu et al., U.S. Pat. No. 5,232,675; Zhicheng et al., U.S. Pat. No. 5,380,690; and Shi et al., U.S. Pat. No. 6,211,104. Reactor temperatures range between approximately 900° F. to approximately 1500° F.

One or more inlets 18 along the length of the riser 1 deliver hydrocarbon feed into the riser to be contacted with the hot catalyst for cracking, preferably through atomization nozzles as are known to those skilled in the art. Hydrocarbon feed is converted as it travels upwardly through the riser 1 in contact with the hot catalyst to the top end of the riser 1. At the top end of the riser, in FIG. 1, the riser ends 19 and abruptly changes direction, directing the effluent into transfer conduit 20. Of course, any of the other riser termination configurations known to those skilled in the art may be employed in the practice of the present invention. Exemplary termination systems include, but are not limited to rough cut cyclones; an inverted can separator (Pfeifer et al. U.S. Pat. No. 4,756,886); a baffle separator (Haddad et al., U.S. Pat. No. 4,404,095); a rams horn separator (Ross, Jr. et al., U.S. Pat. No. 5,259,855); a globe separator (Barnes, U.S. Pat. No. 4,891,129); a U-shaped separator (Gartside et al., U.S. Pat. No. 4,443,984); or direct close-coupled cyclones (Haddad et al., U.S. Pat. No. 4,737,346 and Kam, U.S. Pat. No. 4,749,471).

The impingement of the effluent on the inside surface of end of riser 19 and the abrupt change of direction through outlets 21 causes most of the solids rich phase containing the hot spent catalyst flowing from the cracking zone to separate from the product rich vapor phase and fall directly into the dense phase catalyst bed 6 in the stripper 4 located in the lower section of disengaging vessel 3. The hot spent catalyst, containing a significant amount of cracked hydrocarbon vapor absorbed onto the catalyst surface during the cracking reaction, is collected in dense phase catalyst bed 6 and next is subjected to stripping phase during which the absorbed hydrocarbons are stripped from the catalyst.

The uncollected product rich vapor phase exiting outlet 21 flows into the upper dilute phase of the disengaging vessel 3 and enters secondary catalyst/gas separators such as cyclone 15, through an inlet 22 for further separation. Catalyst particles and fines entrained in the product rich vapor phase are separated in the cyclone 15 and fall from the cyclones to the dense catalyst bed 6 through dipleg 23. The hydrocarbon rich vapors exit the cyclone 15 in disengaging vessel 3 via conduit 24, through which they proceed to associated downstream product recovery systems (not shown). The disengager of the present invention may include more than one cyclone arranged in parallel and/or series as is well known to those skilled in the art.

Hot spent catalyst in dense bed 6 is fluidized and transferred by gravity downward through stripping vessel 4 and ultimately through conduit 25 to regenerator 2. Stripper 4 preferably has a series of baffles 26 or packing (not shown) for improving the contact of the downward flowing catalyst particles with an upflowing stripping medium, such as steam, that enters the stripping vessel 4 through inlet 7, preferably in the lower portion of stripper 4. Stripping gas may be distributed over the cross-section of the stripping zone by a distributor (not shown). Stripped hydrocarbon vapors, as well as stripping medium, rise upwardly through bed 6 to the dilute phase of disengaging vessel 3 where they enter a cyclone separator 15 via inlet 22 and exit the disengaging vessel 3 through conduit 24.

The temperature of the hot catalyst in bed 6 is monitored via temperature sensing device 50, located in stripping vessel 4, shown here, for illustrative purposes only, in the lower portion of stripper 4, although other locations and/or more than one sensor may be employed in the practice of the present invention. In the practice of the present invention, the temperature of the spent catalyst in bed 6 is maintained from about 950° F. to a temperature below about 1075° F., preferably below about 1050° F., and most preferably below about 1025° F. by the provision of a catalyst cooler 5. Thus, when the temperature in the dense bed 6 exceeds a target temperature of, for the purposes of this preferred embodiment, 1040° F., temperature sensor 50 sends a signal via a line 54 to valve 52 to allow hot spent catalyst in dense bed 6 to proceed through stripper-cooler conduit 8 into catalyst cooler 5. Lift gas is introduced through inlet conduit 27 located at the bottom of conduit 8a to lift the hot spent catalyst through stripper-cooler conduit portion 8a to external cooler 5. Lift gas introduced through inlet conduit 27, fluidizes the hot spent catalyst particles and carries them through cooler 5 and across cooling surfaces 11, effecting indirect heat exchange with the cooling liquid flowing within cooling liquid zones 12. Although FIG. 1 illustrates an upflowing catalyst cooler it will be appreciated by those skilled in the art that other configurations, such as downflow, are within the scope of the present invention.

The heat exchange surfaces 11 of this embodiment are comprised of the external walls of a series of cooling coils, fins, tube bundles or the like. The cooling liquid zones 12 are found in the interior of the cooling coils or tube bundles 31 through which a cooling liquid such as water enters the cooler 5 through supply tube 13, flows counter to the flow of spent catalyst through cooler 5, and exits via the discharge tube 14 after heat exchange. Generally, although not critical to the practice of the present invention, the length of the heat exchange tubes 31 are about one-half to three-quarters the length of the interior of the cooler 5. Outside the heat exchange vessel 5 the supply tube 13 and discharge tube 14 diverge, each having a control valve, 29 and 30, respectively, for control of the rate of flow of cooling liquid through the bundles. In a preferred embodiment at least 5, and typically 10-20 or more, heat exchange tubes 31 are used in the vessel 5. However, any structures known to the art to increase the surface area of cooling surfaces 11 and increase the transport of cooling liquid through zones 12 to effect improved indirect heat transfer are contemplated for use with the present apparatus and process.

After flowing past and effecting contact with cooling surfaces 11, the now cooled catalyst is returned to the disengaging vessel 3 via cooled catalyst return conduit 9 and cooled catalyst separator 28. Cooled catalyst separator 28 can take the form and configuration of any separator as described above for riser termination device 20. In FIG. 1, separator 28 is T-shaped and subjects the cooled catalyst and lift gas to an abrupt change of direction to separate the cooled catalyst from the lift gas and to allow the cooled catalyst to be returned to dense bed 6, optionally through a dipleg (not shown). The separated lift gas flows through the upper dilute phase of disengaging vessel 3 to a cyclone 15 where any remaining entrained catalyst is separated and the lift gas is ultimately removed via conduit 24. Upon collecting in dense bed 6, the cooled catalyst lowers the temperature of the catalyst in the dense bed to the target temperature, at which point temperature sensor 50 signals valve 52 to close or reduce the flow of catalyst through the cooler. Alternatively, especially in embodiments where lift gas entering conduit 27 can function as a stripping gas, cooled catalyst return conduit 9 can return the lift gas and cooled catalyst directly to the dense bed 6, thereby obviating the need for additional separation equipment 28. The lift gas will proceed upward through dense bed 6 with the stripping gas and enter the dilute phase of the disengaging vessel 3.

Alternatively, or additionally, the temperature of the dense bed 6 can be regulated by provision of a temperature sensor in cooled catalyst return conduit 9 (not shown). The temperature sensors may also be coupled to means for regulating the flow of lift gas through the cooler to control the residence time of the catalyst in the cooler and rate of heat exchange within the catalyst cooler, or, less preferably, the amount of cooling water being circulated through the catalyst cooler.

The intermediate temperature mixture of spent catalyst in dense bed 6 is withdrawn from stripper 4 via spent catalyst standpipe 25 to the regenerator 2 for the oxidative removal of coke from the surface thereof. Numerous designs are known in the art for catalyst regenerators, such as one-stage and two-stage designs, including those that work in direct cooperation with their own catalyst regeneration cooler. These specific regenerator designs are not critical to the present invention and accordingly are not described herein in detail. The regenerated catalyst conduit 17 returns regenerated catalyst to riser 1, as previously described.

Figure 2:
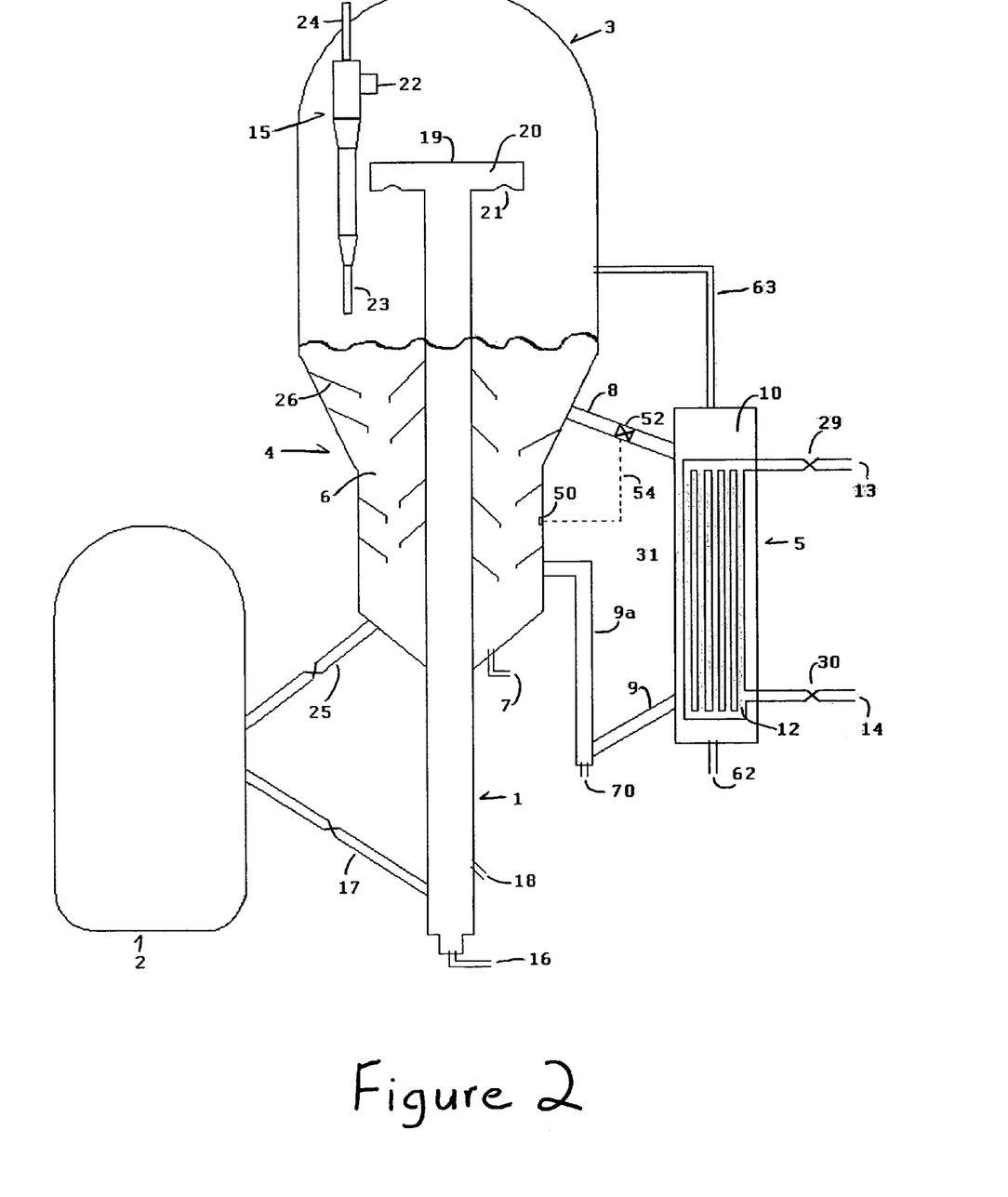
FIG. 2 is a schematic plan view of another embodiment of the present invention.

Referring to FIG. 2, there is shown a catalytic cooling system comprising the same basic design as in FIG. 1, with the following modifications to the apparatus and process for controlling the temperature of the spent catalyst in stripper 4, which modifications also illustrate another non-limiting preferred embodiment of the present invention. In this example, the stripper cooling system is a downflow system. When temperature sensor 50 detects that the temperature of the catalyst in the stripper 4 exceeds the target point, sensor 50 signals via a line 54 to slide valve 52 to open, permitting flow of hot spent catalyst from an upper portion of bed 6 down stripper-cooler conduit 8, and into cooler 5, thereby controlling the amount of hot spent catalyst in the stripper that is subjected to heat exchange in cooler 5. The withdrawn catalyst is cooled in cooler 5 by indirect contact with cooling liquid flowing through cooling zone 12.

Lift or fluidization gas may be introduced through inlet conduit 62 to fluidize the hot spent catalyst particles as they pass through cooler 5 and across cooling surfaces 11. Lift or fluidization gas introduced through conduit 62 also may function as a stripping gas. Operating in the downflow manner has the advantage of reducing erosion in the cooler. Venting conduit 63 is provided at the top portion of cooler 5 and is in flow communication with disengaging vessel 3, thereby providing a means for release of excess lift gas from cooler 5 and ultimately from the system through conduit 24 or other means as are known in the art.

As described previously, temperature sensor 50 or other temperature sensing means alternatively or additionally may be coupled to means for controlling the amount and rate of lift gas entering conduit 62 thereby providing a further means of controlling the amount of indirect heat exchange with the cooling liquid flowing within cooling liquid zones 12.

After flowing past and effecting contact with cooling surfaces 11, the now cooled catalyst is returned to dense bed 6 via cooled catalyst return conduit 9. Cooled catalyst flows down conduit 9. Where the catalyst withdrawal conduit 9 is below stripper, lift gas may be introduced through inlet conduit 70 located at the bottom of conduit portion 9*a* to lift the hot spent catalyst through cooled catalyst return conduit portion 9*a* to dense bed 6. In another variation, the cooled catalyst may flow out of cooler 5 directly into dense bed 6 where the catalyst withdrawal conduit 9 is above the stripper.

As previously described, the cooled catalyst, upon collecting in dense bed 6, lowers the temperature of the catalyst in the dense bed to the target temperature, at which point temperature sensor 50 signals valve 52 to close or reduce the flow of catalyst through the cooler. The stripped spent catalyst in dense bed 6 is withdrawn from stripper 4 via spent catalyst standpipe 25 to the regenerator 2 for the oxidative removal of coke from the surface thereof. The regenerated catalyst conduit 17 returns regenerated catalyst to riser 1.

Figure 3:
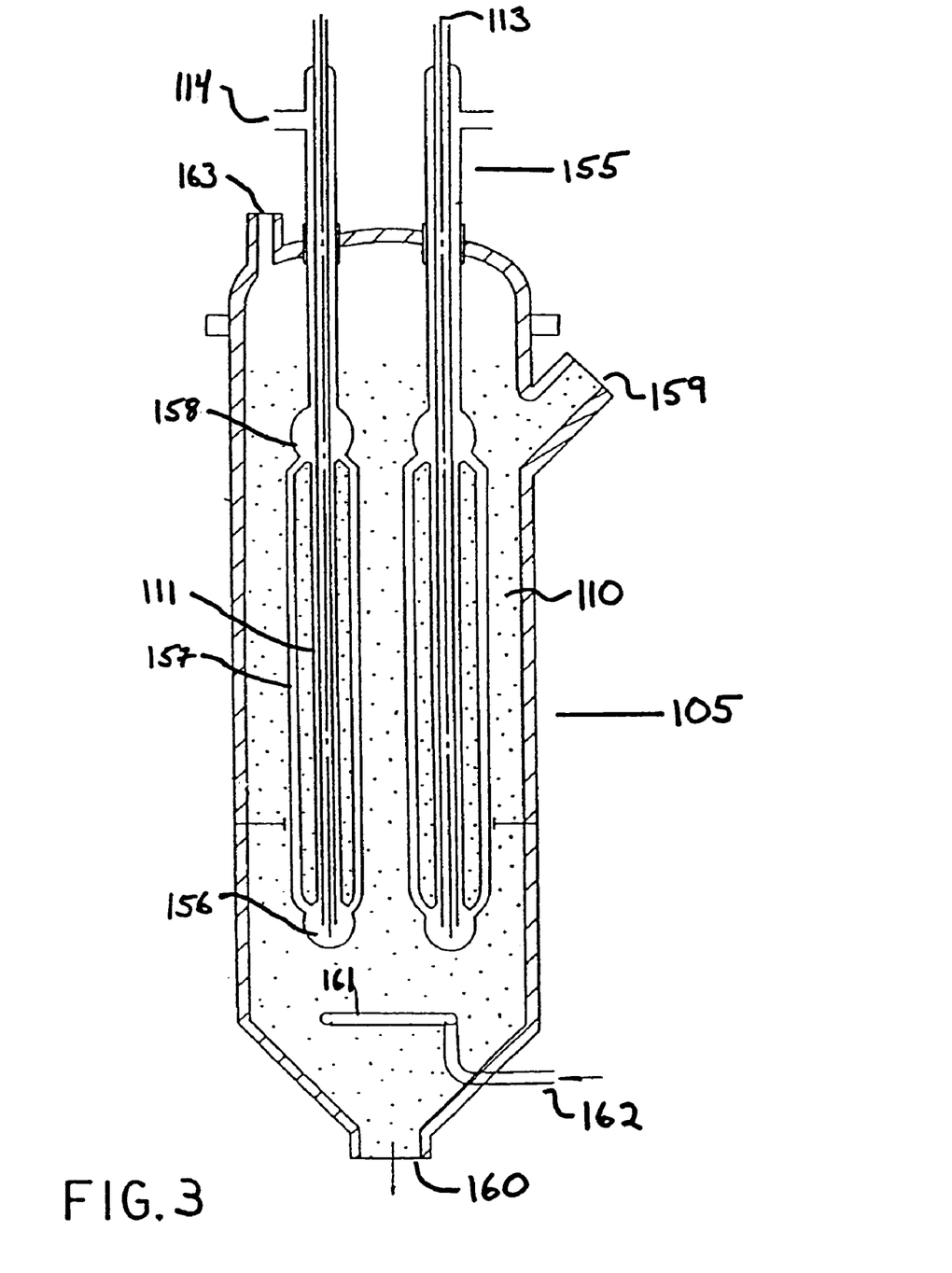
FIG. 3 is a schematic plan view of a preferred cooling vessel.
Figure 4:
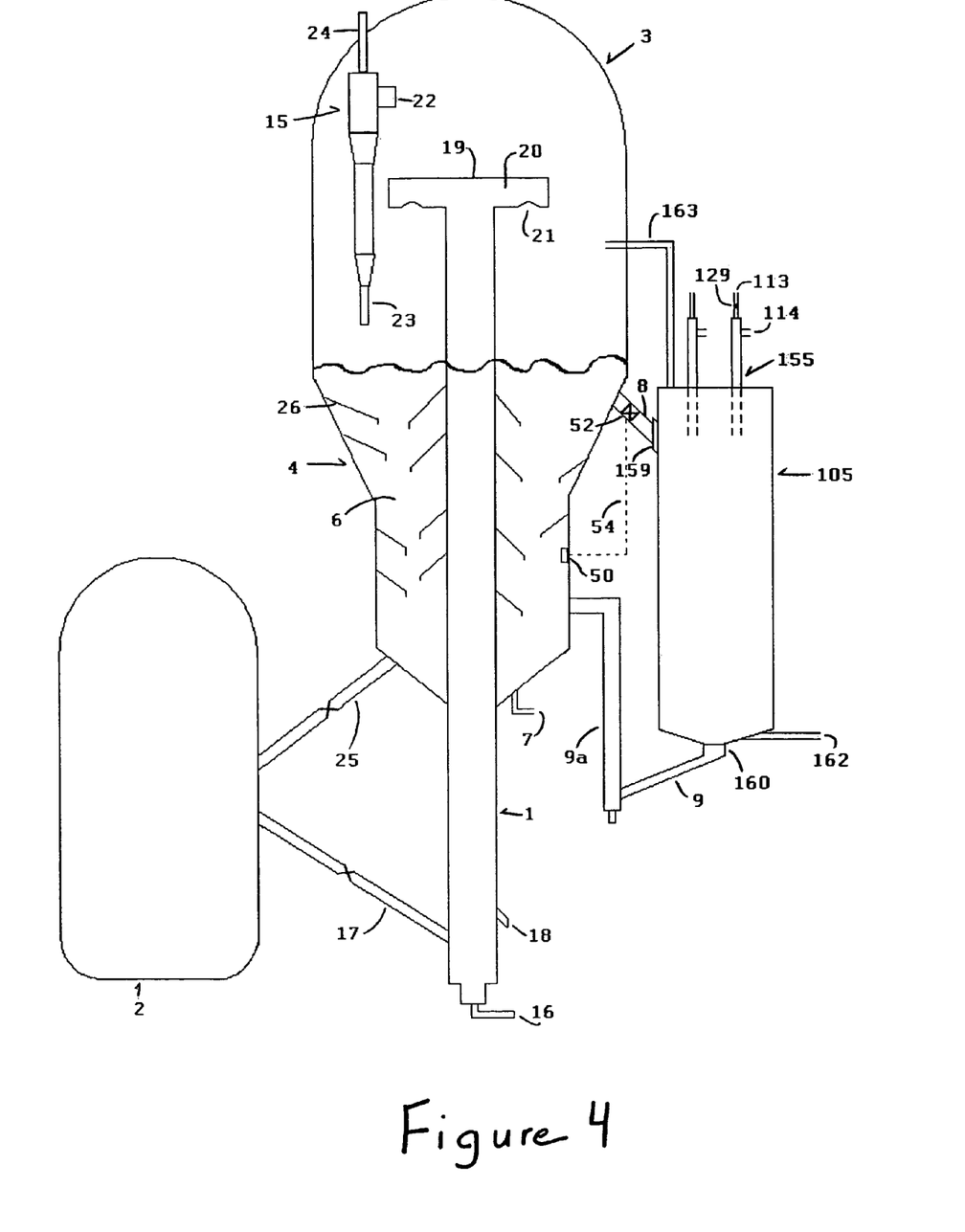
FIG. 4 is a schematic plan view of a preferred cooling vessel in a preferred arrangement with the catalyst stripping unit.

While FIGS. 1 and 2 were described with a conventional tube in bundle catalyst cooler for illustrative purposes, it is preferred to practice the present invention using a catalyst cooler having a construct, such as shown in U.S. Pat. Nos. 5,351,749 and/or 5,571,482. Referring to FIGS. 3 and 4, the external cooler 105 comprises one or more independent and separate modular heat exchange tube units 155 or bundles being housed in a substantially vertical cylindrical cooling vessel 105. Each of the heat exchange tube units 155 comprises a supply cooling liquid inlet tube 113, a cooling liquid collecting chamber or cylinder conduit 156, a central casing heat removal tube 111 and one or more sideline heat removing tubes 157, a steam collecting chamber 158, a steam discharge tube 114, hot catalyst inlet 159 in flow communication with stripper-cooler conduit 8, and cooled catalyst outlet 160 in flow communication with cooled catalyst return conduit 9. A valve 129 provided on the supply cooling liquid inlet tube, may be opened or closed to control the flow of cooling liquid into any one of the tube units. A fluidized gas distributor 161 is located at a lower portion of cooling vessel, with a fluidizing gas inlet 162 located externally. The flow of fluidizing gas may be adjusted to vary the heat transfer rate within the cooling vessel 105. A fluidizing gas discharge outlet 163 is located at an upper portion of cooler. FIG. 4 illustrates a preferred cooperating arrangement between cooler 105 and stripping vessel 6.

Hot spent catalyst flows into a cooling zone 110 of the cooling vessel 105 through inlet area 159 in flow communication with stripper-cooler conduit 8, with stripper cooler conduit 8 being fitted with a control valve 52 as previously shown for the control of the rate and amount of hot spent catalyst through the heat exchange zone 110 in response to feedback from temperature sensing means 50 located in the stripper. The catalyst particles flow downwardly in the form of a fluidized dense phase bed that is formed by a fluidizing gas being upwardly passed out of distributor 161 through the cooling zone 110 and exiting outlet 163.

Figure 5:
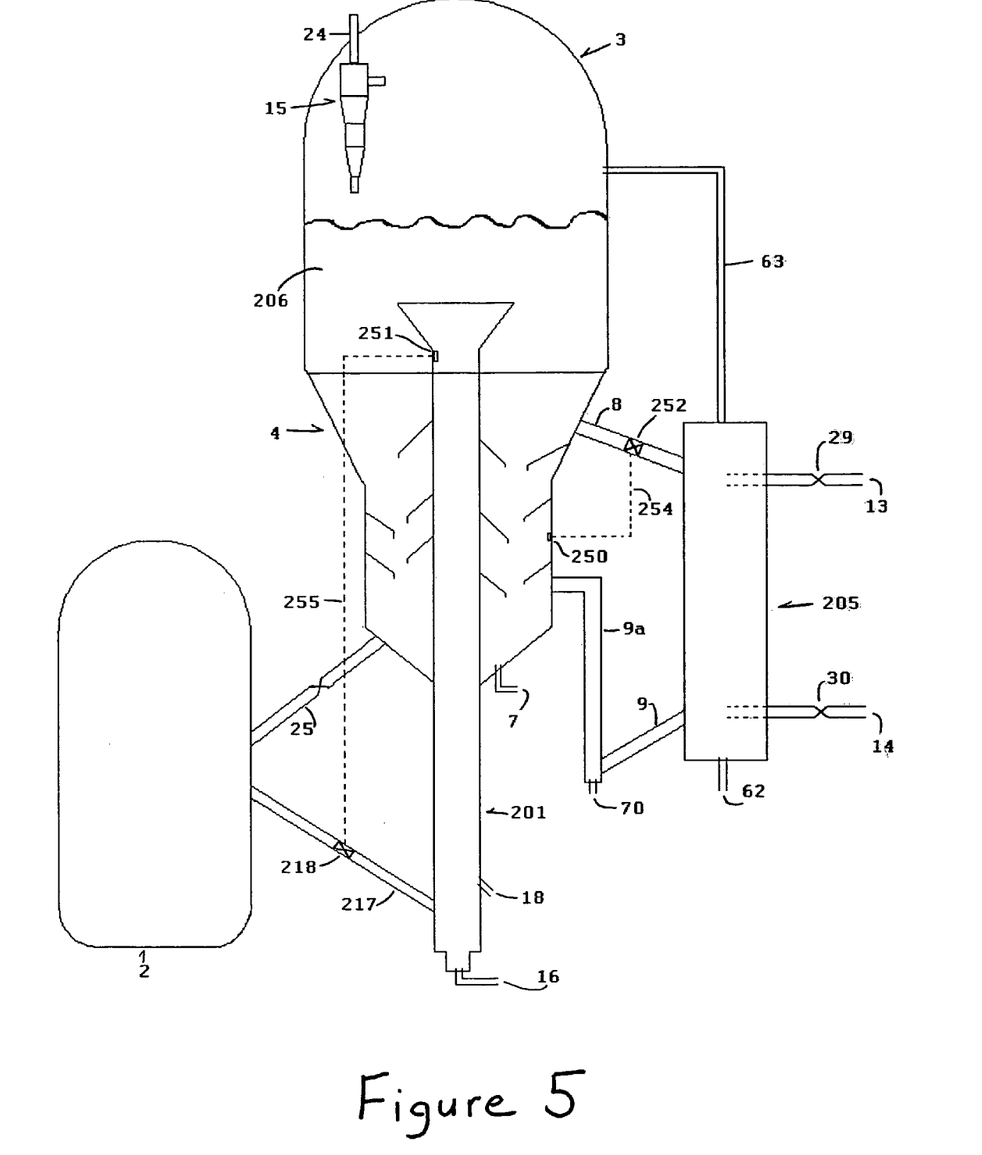
FIG. 5 is a schematic plan view of another preferred embodiment of the present invention.

A further embodiment of the present invention is shown in FIG. 5. In this example, the top of riser 201 discharges directly into an upper portion of dense bed 206. Riser 201 has at its top end a cone-shaped outlet, as is known in the art, located below the surface of dense bed 206. In this embodiment, the top of riser 201 flows directly into reactor dense bed 206, obviating the need for a separator. Riser 201 is equipped at its top end with a thermocouple 251 that communicates, via line 255, with slide valve 218 to control the flow of hot regenerated catalyst from regenerator 2 through conduit 217 back into the bottom end of riser 201.

This expedient can be employed in any of the embodiments of the present invention to control the reactor outlet temperature. As can be seen from the figure, dense bed 206 is located directly above, and in flow communication with stripper zone 4.

In the embodiment shown in FIG. 5, thermocouple 250, located in stripper 4, is provided to control, via slide valve 252, the flow of hot catalyst out of stripper 4 through conduit 8 and into cooler 205, as previously described. It should also be apparent that the present invention embodies the temperature dependent control of the flow of cooled catalyst out of cooler 205 via a slide valve placed within conduit 9 (not shown). In this embodiment, as in all the embodiments contemplated by the present invention, the catalyst cooler 205 may be run full of catalyst, or run with a portion of catalyst below one hundred percent volume capacity.

Many variations of the present invention will suggest themselves to those skilled in the art in light of the above-detailed description. For example, the stripper catalyst cooler may comprise an internal cooling system of coils, fins or the like located within the stripper to effect indirect heat exchange therein. In addition, instead of a riser reactor any fluid catalyst cracking reactor, such as transfer lines, downflow or horizontal reactors (see, e.g., Castagnos, Jr. et al., U.S. Pat. No. 4,419,221), may be employed in the practice of the present invention. All such obvious modifications are within the full intended scope of the appended claims.

All of the above-referenced patents, patent applications and publications are hereby incorporated by reference in their entirety.

I claim:

1. A catalytic cracking process for catalytically cracking a hydrocarbon feed to lighter hydrocarbon products, said process comprising the steps of: (a) contacting a hydrocarbon feed with hot catalytic particulates in a catalytic cracking reactor to produce an effluent comprising spent catalyst particles and lighter hydrocarbon products; (b) separating said spent catalyst particles from said light hydrocarbon products in a separator; (c) stripping said spent catalyst particles by contacting said spent catalyst particles with a stripping medium in a stripping zone; (d) monitoring the temperature of the spent catalyst particles in said stripping zone to determine whether the temperature exceeds a target stripping temperature ranging from about 950° F. to about 1075° F.; (e) withdrawing a portion of said spent catalyst particles from said stripping zone when the temperature of the spent catalyst particles exceeds said target stripping temperature and directing said spent catalyst particles to a catalyst cooler; and (f) cooling said withdrawn catalyst in said catalyst cooler and returning said cooled catalyst to said stripping zone to reduce the temperature of the catalyst in said stripping zone to a temperature below said target stripping temperature.

2. A process as defined in claim 1 wherein said cracking reactor is selected from the group consisting of a riser reactor, a horizontal reactor and a downflow reactor.

3. A process as defined in claim 2 wherein said cracking reactor is a riser reactor.

4. A process as defined in claim 1 wherein said hydrocarbon feedstock is selected from the group consisting of naphtha, gas condensates, raffinate, atmospheric gas oil, vacuum gas oil, distillate, crude oil, crude resid and mixtures of any of the foregoing.

5. A process as defining claim 1 wherein said separator is located in an upper dilute phase zone of a disengaging vessel and said stripping zone is located in a lower dense phase zone of said disengaging vessel.

6. A process as defined in claim 5 wherein said stripping zone is provided with baffles.

7. A process as defined in claim 5 wherein said stripping zone is provided with packing.

8. A process as defined in claim 5 wherein said catalyst cooler is located external to said disengaging vessel.

9. A process as defined in claim 8 wherein said catalyst cooler receives hot spent catalyst from a top portion of said stripping zone, cools said hot spent catalyst in an indirect heat exchanger and returns cooled spent catalyst to a lower portion of said stripping zone.

10. A process as defined in claim 8 wherein said catalyst cooler receives hot spent catalyst from a lower portion of said stripping zone, adds lift gas to said withdrawn hot spent catalyst to lift said withdrawn hot spent catalyst through an indirect heat exchanger for cooling; returns said cooled spent catalyst to the upper dilute phase of said disengaging vessel; separates lift gas from said cooled spent catalyst and returns the separated cooled spent catalyst to the stripping zone.

11. A process as defined in claim 8 wherein said catalyst cooler receives hot spent catalyst withdrawn from a lower portion of said stripping zone, adds lift gas to said withdrawn hot spent catalyst to lift said withdrawn hot spent catalyst through an indirect heat exchanger for cooling; returns said cooled spent catalyst to the stripping zone.

12. A process as defined in claim 1 wherein said target stripping temperature ranges from about 950° F. to about 1050° F.

13. A process as defined in claim 12 wherein said target stripping temperature ranges from about 950° F. to about 1025° F.

14. A process as defined in claim 1 wherein temperature monitoring step (d) comprises placing at least one temperature sensor in the stripping zone, said temperature sensor signaling a valve control means to control the amount of catalyst being withdrawn from said stripping zone to said catalyst cooler.

15. A process as defined in claim 1 further comprising: (g) withdrawing stripped spent catalyst from said stripping zone to a catalyst regenerator; (h) regenerating catalyst in said regenerator to produce hot regenerated catalyst; and (i) returning hot regenerated catalyst to said reactor.

16. An improved catalytic cracking process comprising a catalyst stripping zone, said improvement comprising (i) monitoring the temperature of spent catalyst particles in said stripping zone to determine whether the temperature exceeds a target stripping temperature ranging from about 950° F. to about 1075° F.; (ii) withdrawing a portion of said spent catalyst particles from said stripping zone when the temperature of the spent catalyst particles exceeds said target stripping temperature and directing said spent catalyst particles to a catalyst cooler; and (iii) cooling said withdrawn catalyst in said catalyst cooler and returning said cooled catalyst to said stripping zone to reduce the temperature of the catalyst in said stripping zone to a temperature below said target stripping temperature.

17. An improved process as defined in claim 16 wherein said catalyst cooler receives hot spent catalyst from a top portion of said stripping zone, cools said hot spent catalyst in an indirect heat exchanger and returns cooled spent catalyst to a lower portion of said stripping zone.

18. An improved process as defined in claim 16 wherein said catalyst cooler receives hot spent catalyst withdrawn from a lower portion of said stripping zone, adds lift gas to said withdrawn hot spent catalyst to lift said withdrawn hot spent catalyst through an indirect heat exchanger for cooling; returns said cooled spent catalyst to the upper dilute phase of said disengaging vessel; separates lift gas from said cooled spent catalyst and returns the separated cooled spent catalyst to the stripping zone.

19. An improved process as defined in claim 16 wherein said catalyst cooler receives hot spent catalyst withdrawn from a lower portion of said stripping zone, adds lift gas to said withdrawn hot spent catalyst to lift said withdrawn hot spent catalyst through an indirect heat exchanger for cooling; returns said cooled spent catalyst to the stripping zone.

20. An improved process as defined in claim 16 wherein said target stripping temperature ranges from about 950° F. to about 1050° F.

21. An improved process as defined in claim 20 wherein said target stripping temperature ranges from about 950° F. to about 1025° F.

22. A process as defined in claim 16 wherein temperature monitoring step comprises placing at least one temperature sensor in the stripping zone, said temperature sensor signaling a valve control means to control the amount of catalyst being withdrawn from said stripping zone to said catalyst cooler.

23. A catalytic cracking process for catalytically cracking a hydrocarbon feed to lighter hydrocarbon products, said process comprising the steps of: (a) contacting a hydrocarbon feed in a reaction zone with hot catalytic particulates in a catalytic cracking reactor to produce an effluent comprising spent catalyst particles and lighter hydrocarbon products; (b) discharging said effluent from a reactor outlet into a dense bed; (c) controlling the reactor outlet temperature to a temperature above about by controlling the amount of said hot particulate catalyst contacting said feed in said reaction zone; (d) stripping said spent catalyst particles in a stripping zone in a lower portion of said dense bed by contacting said spent catalyst particles with a stripping medium; (e) monitoring the temperature of the spent catalyst particles in said stripping zone to determine whether the temperature exceeds a target stripping temperature ranging from about 950° F. to about 1075° F.; (fJ withdrawing a portion of said spent catalyst particles from said stripping zone when the temperature of the spent catalyst particles exceeds said target stripping temperature and directing said withdrawn spent catalyst particles to a catalyst cooler; and (g) cooling said withdrawn catalyst in said catalyst cooler and returning said cooled catalyst to said stripping zone to reduce the temperature of the catalyst in said stripping zone to a temperature below said target stripping temperature.

* * * * *